United States Patent [19]

Palacios-Mendoza

[11] 4,437,889
[45] Mar. 20, 1984

[54] METHOD OF RECOVERING SILVER FROM SOLID AND LIQUID PHOTOGRAPHIC WASTE

[76] Inventor: Eliodoro Palacios-Mendoza, Calle Centro. Santa Sofia QTA. Gimereli, Caracas, Venezuela, 1060

[21] Appl. No.: 514,351

[22] Filed: Jul. 15, 1983

Related U.S. Application Data

[63] Continuation of Ser. No. 290,694, Aug. 6, 1981, abandoned.

[51] Int. Cl.$^3$ .............................................. C22B 11/00
[52] U.S. Cl. .................................... 75/118 P; 75/109; 75/83
[58] Field of Search ................. 35/118 P, 118 R, 83, 35/107, 109; 423/27

[56] References Cited

U.S. PATENT DOCUMENTS

| | | | |
|---|---|---|---|
| 2,131,072 | 4/1937 | Reid et al. | 75/118 P |
| 2,944,886 | 7/1960 | Fisher et al. | 75/83 |
| 3,929,466 | 12/1975 | Maynahan et al. | 75/118 P |

OTHER PUBLICATIONS

Mellor J. W., Inorganic and Theoretical Chemistry, Jul. 1935, vol. 3, p. 324.

Primary Examiner—Edward J. Meros
Assistant Examiner—Robert L. Stoll
Attorney, Agent, or Firm—Karl F. Ross; Herbert Dubno

[57] ABSTRACT

Silver is recovered from photographic wastes, whether liquid (used developing solution) or a solid (used film) in a completely nonelectrolytic system using a series of physical-chemical reactions. With liquid wastes this is done by first heating them above ambient temperature to a temperature between 45° C. and 65° C. and then mixing them with aqueous nitric acid at a concentration of 65% and having a specific density of 1.40 g/ml. The quantity of nitric acid used forms a liquid: acid ratio with the liquid being treated of between 1:10 and 1:6. The mixture is then allowed to macerate for between 0.7 and 1.5 hours while it is continuously filtered. The filtration residue is then subjected to a second heating to about 600°-700° C. until it turns gray, then it is fused in a closed furnace. The fused product is then dumped directly into water to solidify and produce pure silver. For solid wastes the digestion with nitric acid takes place before calcining the solid materials. This produces a carbonaceous residue which is pulverized and diluted with the nitric acid as with liquid wastes.

4 Claims, 2 Drawing Figures

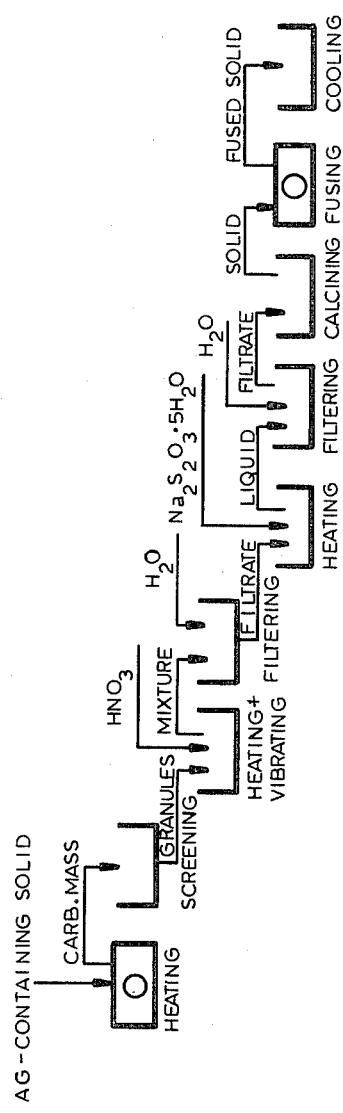

METHOD OF RECOVERING SILVER FROM SOLID AND LIQUID PHOTOGRAPHIC WASTE

This is a continuation of application Ser. No. 290,694 filed Aug. 6, 1981 now abandoned.

FIELD OF THE INVENTION

The present invention relates to a method of recovering silver from solid and liquid photographic waste. More particularly this invention concerns the production of metallic silver from materials containing a very low percentage of silver in either metallic or compounded form.

BACKGROUND OF THE INVENTION

Photographic wastes are known to contain considerable quantities of silver. It is known to recover this silver by means of electrolytic processes such as described in U.S. Pat. Nos. 3,936,363; 3,985,634; 4,039,407; 4,108,658; and 4,126,465. All of these electrolytic methods have certain disadvantages which do not allow them to be used widely at a sufficiently low price to make the recovery of the silver in photographic waste economically worthwhile. The main disadvantage is the necessity of using considerable electrical energy. In addition it is necessary to provide a complex power supply to operate such an electrolytic system, thereby making a very expensive installation, both as regards first costs and operating costs. Furthermore making all of the silver plate out on the electrode is fairly difficult, particularly since it is necessary to reduce to a minimum the generation of hydrogen at the cathode. Furthermore the silver that is thus recovered is normally contaminated by the material of the electrode which is normally of iron. Thus it is normally necessary to further refine the silver thus produced before it can be used for applications requiring silver of a high degree of purity.

It is also known to recover silver from photographic waste by nonelectrolytic systems. Such systems, as seen in U.S. Pat. No. 3,996,046, employ physical-chemical reactions. The main disadvantage of those systems is that they normally also produce silver which is contaminated by other metals, albeit these other metals might also be noble. It is necessary to employ a solubilizing agent such as a metal capable of metathetic interchange with the silver sulfate and not with the other sulfates present in the solution. Thus the metathetic interchange must take place under extremely carefully controlled circumstances so as to obtain the maximum possible quantity of silver ions in the interchanging solubilizing agent. The process is therefore relatively complex and difficult to control, and even so it only produces silver nitrates.

OBJECTS OF THE INVENTION

It is therefore an object of the present invention to provide an improved method of recovering silver from waste.

Another object is to provide an improved method of recovering metallic silver from solid and liquid silver-containing photographic waste.

Yet another object is to provide such a system which operates relatively simply without the considerable energy consumption of the electrolytic systems and without the complexity of the standard physical-chemical systems.

SUMMARY OF THE INVENTION

These objects are attained according to the instant invention in a completely nonelectrolytic system using a series of physical-chemical reactions which are capable of recovering from photographic wastes, whether liquid (such as used developing solutions) or solid (such as used film), virtually 100% of the silver. According to the instant invention this is achieved with liquid wastes by first heating them above ambient temperature to a temperature between 45° C. and 65° C., preferably between 55° C. and 60° C. Once at this temperature the liquid wastes are mixed with aqueous nitric acid at a concentration of 65% and having a specific density of 1.40 grams per ml. The quantity of nitric acid used forms a liquid:acid ratio with the liquid being treated of between 1:10 and 1:6. The mixture is then allowed to macerate during a time between 0.7 and 1.5 hours while it is continuously filtered.

The residue of the filtration is then subjected to a second heating stage, to a temperature of about 600° C.–700° C. for a time sufficient to make it turn gray. This gray material is then fused for between 0.4 and 0.6 hours at a temperature of about 900° C.–1000° C. The fusion operation takes place in a closed furnace. The fused product is then dumped directly from the crucible into water to solidify it, producing silver having a purity of better than 99.5%.

For solid wastes the step of basic digestion with aqueous nitric acid takes place before calcining the solid materials such as films, negatives, photographic plates and the like so as to produce a carbonaceous residue. This carbonaceous residue is comminuted by pulverization so as to produce a powder that is then passed through a very fine mesh. The powder is diluted with 65% nitric acid having a density of 1.40 grams per ml. in a proportion that can vary between 150 ml and 180 ml of nitric acid per kilogram of powder. Then the process is continued as with the liquid wastes, by means of filtration of the product and washing of the carbonaceous residue which is repeated until the wash liquid does not react to silver ions.

Then the filtrates are mixed with a solution of sodium thiosulfate pentahydrate in a proportion of about 200–300 grams of thiosulfate per kilogram of powder which is then heated to between 50° C. and 80° C. The rest of the steps of the procedure are similar to those for liquid wastes.

In both cases practically all of the silver content of the materials is recovered as metallic silver having a purity of better than 99.5%. The main factor affecting the purity is contamination with other metals. Thus it is necessary to use a graphite crucible for the procedures so as to avoid that the silver, as it fuses, is contaminated by the metal of the crucible.

BRIEF DESCRIPTION OF THE DRAWING

FIG. 1 is a diagram illustrating Example 1 below; and
FIG. 2 is a flow diagram illustrating Example 2 below.

EXAMPLE 1

A 5000 cc heating vessel is filled with 0.5 liters of spent fixing liquid coming from an X-ray developing laboratory. The temperature of the fixing solution is raised by heating it over a Bunsen burner to about 60° C. Then while agitating the liquid 4 liters of 65% nitric acid having a density of 1.40 grams per ml are added for a period of about 30 seconds. The agitation of the mixture is stopped for an hour while the temperature is maintained between 55° C. and 65° C.

The thus macerated mixture is then filtered through a porous ceramic filter and thereafter is introduced into another vessel in which it is washed with water at ambient temperature. The residue of the filtration is continuously collected in a ceramic dish and is heated to a temperature of about 65° C. for approximately 0.5 hours, during which time the residue takes on the appearance of a grey solid. This solid is put into a graphite crucible and introduced into a furnace at a temperature of about 960° C., where it stays for 1.0 hour. The material is taken out of the furnace and dumped immediately, while still fused, into a vessel containing water at ambient temperature so as to solidify it.

The solid thus obtained, which weighs about 2 grams, giving a yield of 0.4%, has been found by spectrographic analysis to be metallic silver having a purity of about 99.9%.

EXAMPLE 2

About 500 pieces of solid materials such as unusable X-ray plates are introduced into a wide-mouth 1500 cc vessel in which they are heated until they form a carbonaceous residue. The temperature is not regulated but is heated as much as is economically reasonable. The calcined material is then cooled to ambient temperature and is pulverized to an extremely fine powder which may be passed through a mesh.

The powder is then put into a reaction vessel in which it is mixed with 65% nitric acid at a temperature of about 50° C. This vessel is agitated. Then it is allowed to remain at this temperature for about 1 hour during which it is continuously washed with water, repeating the washing until the wash liquid does not react to silver. The filtrate thus obtained is treated with sodium thiosulfate in a proportion of one part of sodium thiosulfate to four parts of powder. It is heated to a temperature of about 60° C. to facilitate the mixing. Then the steps of Example 1 are followed.

The solid thus obtained from the water in the last step weighs about 4.7 grams, giving a yield of 0.95%. Spectrographic analysis indicates that it is metallic silver of a purity greater than 99.8%.

I claim:

1. A method of recovering silver from a silver-containing photographic liquid fixer waste, comprising:
   (a) heating the silver-containing photographic liquid fixer waste to a temperature between about 45° C. and 65° C.;
   (b) mixing under agitation said heated silver-containing photographic liquid waste with aqueous nitric acid at a 65% concentration and having a specific density of 1.40 grams per ml at a ratio of at most eight parts of nitric acid to one part of said photographic liquid waste;
   (c) digesting said mixture during a period between 0.7 and 1.5 hours at a temperature between 55° C. and 65° C.;
   (d) filtering through a porous ceramic filter the digested mixture and washing the filtrate at room temperature;
   (e) the filtered residue is collected in a ceramic dish and heated therein to a temperature of about 65° C. for about 0.5 hours;
   (f) subjecting the heated filtered residue to a further heating stage in a temperature ranging between about 600° C. and 700° C. until said residue turns into a gray solid;
   (g) fusing at a graphite crucible said gray solid during between about 0.4 and 0.6 hours in a temperature between about 900° C. and 1000° C.; and
   (h) dumping the fused product directly from the graphite crucible into water at room temperature to solidify it, obtaining a 99.5% purity silver.

2. The method defined in claim 1 wherein the temperature in step (a) is between 55° C. and 65° C. and the temperature in step (f) is between 650° C. and 680° C.

3. A method of recovering silver from a silver-containing photographic film waste, comprising:
   (a) heating the silver-containing film waste until a carbonaceous residue is obtained;
   (b) cooling to ambient temperature and comminuting by pulverizing said carbonaceous residue to obtain a fine powder;
   (c) screening said fine powder through a very fine mesh;
   (d) treating in a reaction vessel at about 50° C. under agitation said screened fine powder with 65% aqueous nitric acid having a density of 1.40 grams per ml, at a ratio varying between 150 ml and 180 ml of aqueous nitric acid per kilogram of powder;
   (e) digesting the powder during one hour in step (d) at about 50° C. and then continuously washing it with water until substantially all the silver is leached;
   (f) heating under agitation said wash liquid;
   (g) mixing at a temperature of about 60° C. the filtrate with sodium thiosulfate pentahydrate at a ratio between about 200 and about 300 grams of sodium thiosulfate pentahydrate per kilogram of powder;
   (h) digesting said filtrate and sodium thiosulfate pentahydrate mixture for a period between 0.7 and 1.5 hours at a temperature between 55° C. and 65° C.;
   (i) filtering through a porous ceramic filter the digested mixture and washing the residue at room temperature;
   (j) the filtered residue is collected in a ceramic dish and heated therein to a temperature of about 65° C. during about 0.5 hours;
   (k) subjecting the heated filtered residue to a further heating stage at a temperature between about 600° C. and about 700° C. until said residue turns into a gray solid;
   (l) fusing in a graphite crucible within a closed oven said gray solid for between about 0.4 hours and about 0.6 hours at a temperature between about 900° C. and about 1000° C.; and
   (m) dumping the fused product directly from the graphite crucible into water at room temperature to solidify it, obtaining a 99.5% purity silver.

4. The method defined in claim 3 wherein the temperature in step (k) is between 650° C. and 680° C.

* * * * *